United States Patent
Bolsius et al.

(10) Patent No.: US 8,326,857 B2
(45) Date of Patent: Dec. 4, 2012

(54) SYSTEMS AND METHODS FOR PROVIDING VALUE HIERARCHIES, RAGGED HIERARCHIES AND SKIP-LEVEL HIERARCHIES IN A BUSINESS INTELLIGENCE SERVER

(75) Inventors: Roger Bolsius, Round Rock, TX (US); Raghuram Venkatasubramanian, Cupertino, CA (US); Ling Ni, Milpitas, CA (US); Donko Donjerkovic, Redwood City, CA (US); Saugata Chowdhury, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 134 days.

(21) Appl. No.: 13/038,231

(22) Filed: Mar. 1, 2011

(65) Prior Publication Data

US 2011/0295836 A1 Dec. 1, 2011

Related U.S. Application Data

(60) Provisional application No. 61/349,754, filed on May 28, 2010.

(51) Int. Cl.
*G06F 17/30* (2006.01)

(52) U.S. Cl. ........ 707/765; 707/603; 707/714; 707/790; 707/802

(58) Field of Classification Search .................. 707/603, 707/714, 765, 790, 802
See application file for complete search history.

(56) References Cited

U.S. PATENT DOCUMENTS

| | | | |
|---|---|---|---|
| 5,787,410 A | 7/1998 | McMahon | |
| 5,805,832 A | 9/1998 | Brown et al. | |
| 6,018,742 A | 1/2000 | Herbert, III | |
| 7,151,438 B1 * | 12/2006 | Hall et al. | 340/286.06 |
| 7,444,342 B1 * | 10/2008 | Hall et al. | 1/1 |
| 7,698,264 B2 * | 4/2010 | Leikucs et al. | 707/999.003 |
| 8,200,618 B2 * | 6/2012 | Gibson et al. | 707/603 |
| 8,234,298 B2 * | 7/2012 | Winter et al. | 707/776 |
| 2006/0136309 A1 | 6/2006 | Horn et al. | |
| 2006/0149716 A1 | 7/2006 | Polo-Malouvier | |
| 2007/0250493 A1 | 10/2007 | Peoples et al. | |
| 2007/0250494 A1 | 10/2007 | Peoples et al. | |
| 2008/0059412 A1 | 3/2008 | Tarin | |
| 2008/0249998 A1 | 10/2008 | Dettinger | |
| 2008/0288525 A1 * | 11/2008 | Leikucs et al. | 707/102 |
| 2009/0030915 A1 * | 1/2009 | Winter et al. | 707/100 |
| 2009/0119309 A1 * | 5/2009 | Gibson et al. | 707/100 |

OTHER PUBLICATIONS

Stober, D., Fueling the Workflow Engine, Intermountain Healthcare, OAUG Forum at Collaborate 2008, http://idealpenngroup.tripod.com/sitebuildercontent/OAUG2008/Collaborate20Collaborate07/pdfs/dstober_wp.pdf [retrieved on Jul. 12, 2011], pp. 1-67.

(Continued)

*Primary Examiner* — Jean M Corrielus
(74) *Attorney, Agent, or Firm* — Fliesler Meyer LLP

(57) ABSTRACT

A business intelligence (BI) server and repository are described which support a set of hierarchical relationships among the data. The BI server receives user input specifying a set of parent-child or other ancestral relationship among a set of data in a data source. The BI server generates a set of SQL queries and executes the queries to pre-populate a set of tables which specify the parent child relationships among the data in the data source. One such table is a parent-child relationship closure table that defines the inter-member relationships among the data members. Once the tables are populated, the BI server uses the closure tables to answer queries that require knowledge of the ancestral relationships among data.

18 Claims, 5 Drawing Sheets

OTHER PUBLICATIONS

Oracle Applications Internationalization Guide, Applications Technology Group, Aug. 9, 2006, http://www.soulcast.com/post/show/12554/Oracle-Applications-Internationalization-Guide [retrieved on Jul. 12, 2011], 24 pages.

* cited by examiner

SYSTEMS AND METHODS FOR PROVIDING VALUE HIERARCHIES, RAGGED HIERARCHIES AND SKIP-LEVEL HIERARCHIES IN A BUSINESS INTELLIGENCE SERVER

CLAIM OF PRIORITY

The present application claims the benefit of U.S. Provisional Patent Application No. 61/349,754, entitled "SYSTEMS AND METHODS FOR PROVIDING VALUE HIERARCHIES, RAGGED HIERARCHIES, SKIP-LEVEL HIERARCHIES, MULTILINGUAL DOUBLE COLUMN SUPPORT AND CUSTOM MEMBERS IN A BUSINESS INTELLIGENCE SERVER," by Roger Bolsius et al., filed on May 28, 2010, which is incorporated by reference herein in its entirety, including all Appendices filed therewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to business intelligence and in particular to representing hierarchical relationships among data in the business intelligence server.

BACKGROUND

In recent years, business intelligence software has become increasingly utilized by large business enterprises and other organizations. Business intelligence provides current and historical views of business operations by analyzing internal, structured data and business processes of the organization. It is often used to create future models and predictions in order to support better business decision making. As such, business intelligence tools can lead to decreased costs and increased efficiency, productivity and profit margins for many companies.

Business intelligence is usually implemented as software and/or hardware tools that are used to collect and analyze data and to transform the raw data into meaningful and useful information used to enable more effective strategic, tactical, and operational insights and decision-making. As such, a typical business intelligence server relies on data that may reside in a variety of places, including but not limited to relational databases, online analytical processing (OLAP) tools, repositories and content management systems, application servers, as well as a number of other sources.

In a typical business intelligence (BI) server, data is collected from all (or some) of these data sources and placed into a (virtual or physical) data warehouse or data mart, where it can then be modeled and analyzed before being presented to the user. For example, one approach is to implement a physical layer within the business intelligence server, where data is modeled as a consolidated table that mirrors objects in the data source layer. An application developer can assemble these compound objects by hand, using a subset of the entities relevant to the domain; the synthesized objects can subsequently be imported into the business intelligence server's metadata and decomposed into dimensions and facts.

However, a number limitations and potential areas of improvement still exist in the field of modeling data within business intelligence servers. For example, it is frequently useful to represent hierarchical relationships among data. In the context of business intelligence, a hierarchy is a set of top-down relationships between certain attributes in a dimension. Many hierarchical relationships can be represented by level-based hierarchies. An example of a level-based hierarchy can be seen in a time dimension, where days roll up into weeks, months roll up into quarters, quarters into years and so on.

In certain cases, however, hierarchies do not have well defined levels. As an illustration, an organization may not be level based. Members within an organization may attributes such as "Title" however, these attributes do not translate well into levels. For example, (a) vice presidents (VPs) may report to other VPs and (b) different VPs can be at different depths from the tree. In addition, some hierarchies do not have values for certain levels. Moreover, some hierarchies exist where all the leaves do not have the same depth. It can be advantageous and desirable to represent all of these hierarchical relationships within the data model of the BI server.

SUMMARY OF INVENTION

In various embodiments, systems and methods are described for allowing a business intelligence (BI) server to expose an enterprise business model as a mixture of relational and multi-dimensional concepts. Query/expression capabilities are a union between what traditional relational and multi-dimensional users expect. All of this functionality is consistently supported across all data sources.

In one embodiment, value hierarchy support is provided for relational data sources integrated with the BI server. Value hierarchies are hierarchies that do not have well-defined levels. For example, data for the members within an organization may contain attributes, such as "title" and the like. However, these attributes may not translate well to levels of a hierarchy because members with the same title may or may not report to other members having the title and can thus be at different depths of the tree. By supplying a value hierarchy-based support, the BI server is able to efficiently run queries having hierarchical filters and limitations on relational data sources that do not natively store data in a hierarchical structure.

In another embodiment, the BI server can unify the concept of ragged hierarchies and skip-level hierarchies between relational data sources and hierarchical data sources, such as OLAP. A ragged hierarchy is an unbalanced hierarchy that does not have levels of the same depth. A skip level hierarchy is a hierarchy that has members that do not have a value for a particular ancestor level. Both types of hierarchies can be represented and navigated in the BI server that unifies non-hierarchical relational data sources with hierarchical OLAP-based sources.

DETAILED DESCRIPTION

Figure 1:
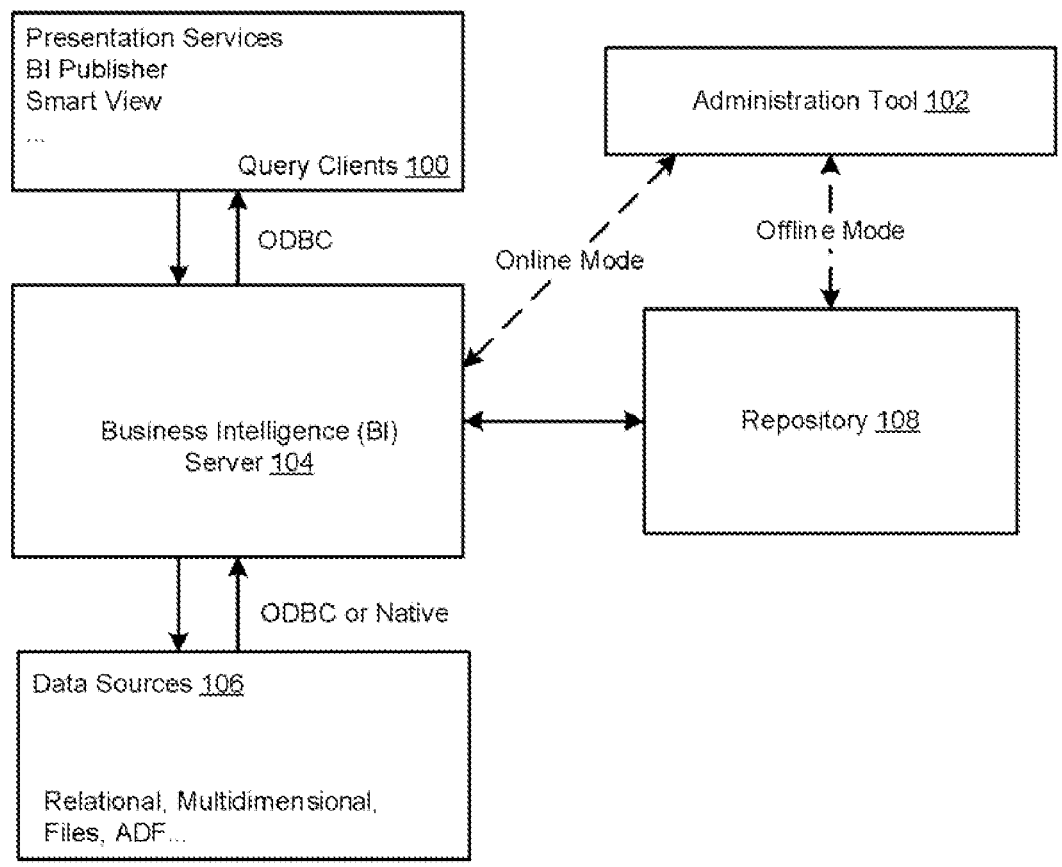
FIG. 1 is an illustration of the BI server in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments described throughout this disclosure, a business intelligence (BI) server is extended with support for value-based hierarchies, skip level hierarchies and ragged hierarchies. A business intelligence server is an analysis server providing a calculation and aggregation engine that integrates data from multiple relational, unstructured, OLAP, and other sources.

In accordance with an embodiment, a value hierarchies feature can be provided on the BI server. This feature of the BI server enables users to query data based on parent-child and other ancestral relationships. For example, a query can request to (a) show all the direct reports of an employee; (b) show all the second level reports of that employee, (c) show all the front line managers under that employee, and (d) show the management chain for an employee. Analyzing data based on these relationships can be highly relevant to the business of the organization. This functionality can be supported against all data sources.

In accordance with an embodiment, a business intelligence server can be integrated with a multitude of different data sources. These data sources can store data in different formats or arrangements that may not necessarily be consistent with each other. For example, relational databases store data in a non-hierarchical structure and as such, certain queries having hierarchical filters may not be as efficiently executable.

In accordance with an embodiment, the BI server can receive user input that specifies the set of parent-child and other ancestral relationships among a set of data stored in a particular data source. Based on that input, the BI server can generate structured query language (SQL) queries and execute them against the data source to pre-populate a set of closure tables that store the transitive closure of the value hierarchy table. This closure table contains one row for every pair of members that have an ancestral relationship of any distance (self, parent, grandparent, great-grandparent, . . . ) In accordance with an embodiment, the columns in this table include: (a) member key; (b) ancestor key; (c) depth of the member from the root of the hierarchy; (d) distance of the member from the ancestor; (e) key of each ancestor indexed beginning from the current member (ancestor1 key, ancestor2 key, . . . ) ancestor1 key is the same as parent key; and (f) key of each ancestor indexed beginning from the root member (level1 key, level2 key, . . . )

In accordance with an embodiment, a full-fledged flattened table consideration can also be provided on the BI server. This flattened table stores a flattened representation of the value hierarchy with the key of each ancestor in a separate column. This table contains one row for each row in the base table. In accordance with an embodiment, the columns in the flattened table include: (1) member key; (2) parent key; (3) depth of the member from the root of the hierarchy; (4) key of each ancestor indexed beginning from the current member (ancestor1 key, ancestor2 key, . . . ) ancestor1 key is the same as parent key; and (5) key of each ancestor indexed beginning from the root member (level1 key, level2 key, . . . ).

In accordance with various embodiments, the closure table and flattened table can be used by the BI server to answer queries that require ancestral relationships among data members. For example, in accordance with an embodiment, the BI server can provide a user interface (UI) that enables a user to define selections using the hierarchical relationships. As a value hierarchy does not have levels, in one embodiment, hierarchical syntax is the only mechanism to define dimensional selections. The UI can provide operators to allow the user to express hierarchical selections such as "is Parent Of", "is Child Of," "Is Ancestor Of," "Is Descendant Of," "Is Sibling Of," "Is Leaf," and the like. In addition, the BI Server can provide drill insert support for value hierarchy, as well as aggregation. Thus, for example, a user can access a member's children, grandchildren and other descendants by drilling down using the GUI provided on the BI server.

In accordance with additional embodiments, support for ragged hierarchies can be provided for the BI server. In one embodiment, a ragged hierarchy is an unbalanced hierarchy in which the leaf data members do not all have the same depth. The BI server can store metadata to indicate that a particular hierarchy is a ragged hierarchy. Within relational data sources the ragged hierarchy can be represented by implementing a separate column for each level of the hierarchy, wherein each level of the hierarchy is represented by a level key. When the BI metadata indicates that a particular hierarchy is ragged and contains an unbalanced structure with levels of varying depth, the columns are filled in for levels of varying depth with null values to balance the hierarchy. If the hierarchy is navigated, the BI server exposes a function to determine whether the column contains a leaf data member to determine if the BI server can drill on the value specified by the function.

In accordance with additional embodiments, support for representing skip level hierarchies can be provided to a BI server. In one embodiment, a skip level hierarchy is a hierarchy that has members that do not have a value for a particular ancestor level. In other words, a skip level hierarchy has members missing at various levels in between the different levels in the hierarchy. The BI server has metadata that specifies which hierarchy is a skip level hierarchy. Similarly to a ragged hierarchy, skip level hierarchies can be represented by implementing a separate column for each level of the hierarchy, wherein each level of the hierarchy is represented by a level key. When the BI server determines that a particular level in the hierarchy is skipped and contains no value at said particular level, that skipped level of the hierarchy can be represented with a null key. Thereafter, if the skipped level is discovered during the retrieval of information while drilling down through the hierarchy, the BI server can determine which next level following the skipped level contains a value and the value in the next level is returned.

The BI server can unify the concepts of skip level hierarchies and ragged hierarchies between relational data sources and hierarchical data sources, such as OLAP. Because the BI server exposes a variety of different data sources as a single semantic model, the model provides for a way to represent ragged hierarchies and skip level hierarchies for data in relational and non-hierarchical databases.

FIG. 1 is an illustration of the BI server in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the BI server 104 and the BI repository 108 provide a layer of abstraction that lets users 100 send simple logical structured query language (SQL) queries against complex federated data sources 106. In accordance with an embodiment, the BI server 104 processes user requests and queries underlying data sources. The BI server can maintain a logical data model and provide client access to this model through open database connectivity (ODBC).

In accordance with an embodiment, the BI server uses the metadata in the repository 108 to perform two tasks (1) to interpret logical SQL queries and write corresponding physical queries against the appropriate data sources 106; and (2) to transform and combine the physical result sets and perform final calculations. The BI server can connect to the underlying data source through either ODBC or over a native application programming interface (API) of the data source.

In accordance with an embodiment, the administration tool 102 is an application that can be used to create and edit the BI repository 108. The admin tool can connect to the repository in offline mode, or it can connect to the repository through the BI server (online mode). In accordance with various embodiments, the additional functionality provided by the BI server can be made available in the online mode.

Figure 2:
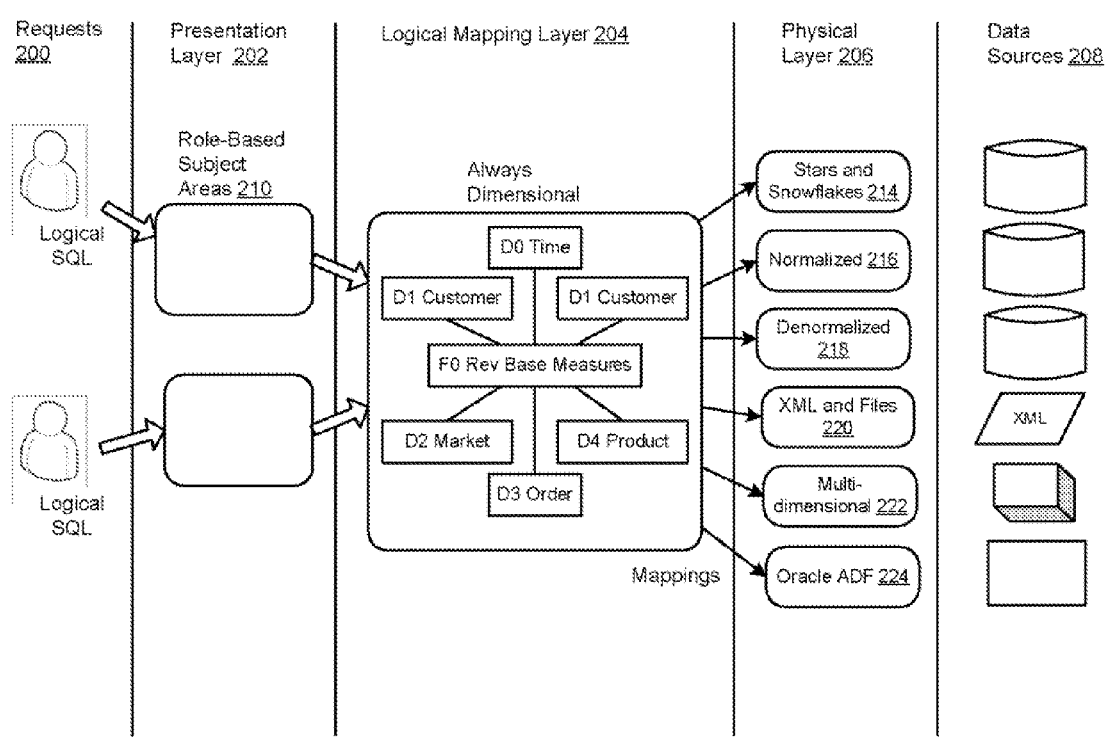
FIG. 2 is an illustration of a query traversing the layers of the BI repository in accordance with various embodiments of the invention.

FIG. 2 is an illustration of a query traversing the layers of the BI repository in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As mentioned above, the BI server can process incoming client requests 200 that are sent against complex federated data sources. In accordance with an embodiment, the BI repository is comprised of three layers: the physical layer 206, the logical mapping layer 204 and the presentation layer 202.

In accordance with an embodiment, the physical layer 206 defines the objects and relationships the BI server needs to write native queries against each physical data source 208. In accordance with an embodiment, a user or administrator creates this layer by importing tables, cubes and flat files from the data sources. For example, as shown in this figure, some of the formats and schemas used in the physical layer can include stars and snowflakes 214, normalized 216 and denormalized 218 data, extensible markup language (XML) and file storage data 220, multi-dimensional data 222, application development framework (ADF) data 224 and other formats. Separating the logical behavior of the application from the physical model provides the ability to federate multiple physical data sources to the same logical object, enabling aggregate navigation and partitioning, as well as dimension conformance and isolation from changes in the physical sources. This separation also enables the creation of portable BI applications.

In accordance with an embodiment, the logical business model and mapping layer 204 defines the business or logical model of the data and specifies the mapping between the business model and the physical schemas. This layer also determines the analytic behavior seen by users, and defines the superset of objects and relationships available to the users. It also hides the complexity of the source data models.

In accordance with an embodiment, the presentation layer 202 provides a way to present customized, secure, role-based views 210 of a business model to users. It adds a level of abstraction over the business model and mapping layer 204 and provides the view of the data seen by users building requests in the presentation services and other clients 200.

In accordance with an embodiment, a typical order for an enterprise to construct a BI repository is to create the physical layer objects firs, the logical model and mapping layer objects next and the presentation layer objects last. However, in alternative embodiments, the user can work on each layer at any stage.

In most cases, planning the business model is the first step in developing a usable data model for decision support. In a business model, a dimension represents a hierarchical organization of logical columns (attributes). One or more logical dimension tables can be associated with at most one dimension. Examples of common dimensions are time periods, products, markets, customers, suppliers, promotion conditions, raw materials, manufacturing plants, transportation methods, media types and time of day. In accordance with an embodiment, dimensions exist in the logical model and mapping layer 204 and in the presentation layer 202.

In each dimension, attributes can be organized into hierarchical levels. These logical levels represent the organizational rules and reporting needs required by the business of the organization deploying the BI server. They provide the structure (metadata) that the BI server uses to drill into and across dimensions to get more detailed views of data.

In accordance with an embodiment, there are two types of logical dimensions: dimensions with level-based hierarchies (structure hierarchies) and dimensions with parent-child hierarchies (value hierarchies). Level based hierarchies are those in which members of the same type occur only at a single level, while members in parent-child hierarchies all have the same type.

One common occurrence of a value hierarchy is an organizational reporting hierarchy chart, where each individual in the organization is an employee, each employee (apart from top-level managers) reports to a single manager, and the reporting hierarchy has many levels. These conditions illustrate the basic features that define a parent-child hierarchy, namely: (1) a parent-child hierarchy (value hierarchy) is based on a single logical table (e.g. "Employee" table); (2) each row in the table contains two identifying keys, one to identify the member itself, the other to identify the "parent" of the member (e.g. Emp_ID and Mgr_ID).

In relational tables, the relationships between members in a parent-child hierarchy are implicitly defined by identifier key values in the associated base table. However, in the BI server, for each parent-child hierarchy defined on a relational table, the inter-member relationships are also defined in a separate parent-child relationship table (closure table).

Figure 3:
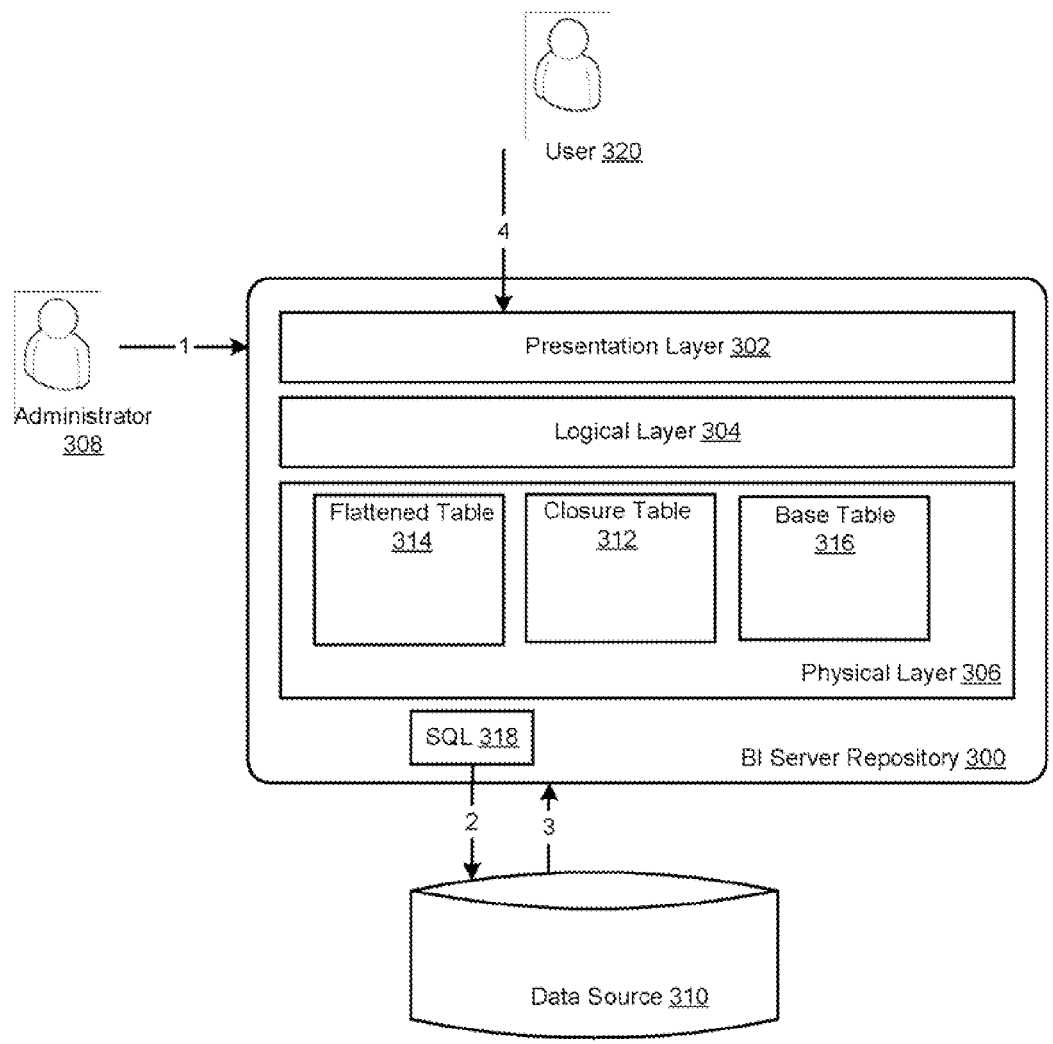
FIG. 3 is an illustration of a BI server that is extended with support for value hierarchies, in accordance with various embodiments of the invention.

FIG. 3 is an illustration of a BI server that is extended with support for value hierarchies, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As previously described, the BI repository 300 is comprised of a presentation layer 302, logical layer 304 and physical layer 306. In order to support value hierarchies in the BI server, the administrator 308 or other user can identify a set of dimensions with parent-child hierarchies and specify them by using a user interface of the BI server. In accordance with an embodiment, the presentation layer can be utilized by the administrator to define the parent-child relationships among various data members.

Once the ancestral relationships are specified, the BI server can materialize a set of tables 312, 314, 316 and generate a set of SQL statements 318. These SQL statements are executed against the data source 310 to populate the tables, such as the closure table 312. More specifically, in addition to the base table 316, a flattened table 314 and a closure table 316 are pre-populated on the BI server. These tables can subsequently be used to answer queries from users 320 that require knowledge of ancestral relationships among the data members. In particular, hierarchical operators can be provided to the BI server, including isParentOf, isDescendantOf, isAncestorOf, isChildOf and the like, which use the closure table to efficiently answer queries involving ancestral relationships. For example, the closure table is used by the BI server to answer queries such as "show me all the descendants of an employee" or "show me all the ancestors of an employee."

In accordance with an embodiment, the flattened table 314 stores a flattened representation of the value hierarchy with the key of each ancestor in a separate column. This table contains one row for each row in the base table. The columns in this table include: (1) member key; (2) parent key; (3) depth of the member from the root of the hierarchy; (4) key of each ancestor indexed beginning from the current member (ancestor1 key, ancestor2 key, . . . ) ancestor1 key is the same as parent key; and (5) key of each ancestor indexed beginning from the root member (level1 key, level2 key, . . . ). Table 1 below illustrates one non-limiting example of the possible SQL used to create the flattened table 314:

TABLE 1 with Flattened(ManagerID, EmployeeID, Depth, HierarchyPath,
    Level1, Level2, Level3, Level4, Level5
)
as
(
  select directs.ManagerID, directs.EmployeeID, 1,
      cast('/' + cast(directs.EmployeeID as varchar) as
varchar(8000)),
      cast(directs.EmployeeID as varchar), null, null, null, null TABLE 1-continued from AdventureWorks.HumanResources.Employee directs where
directs.ManagerID is null
  union all
    select sub.ManagerID, sub.EmployeeID, super.Depth + 1,
      cast(super.HierarchyPath + '/' + cast(sub.EmployeeID as
varchar) as varchar(8000)),
      super.Level1,
      coalesce(super.Level2, case when super.Depth = 1 then
sub.EmployeeID end),
      coalesce(super.Level3, case when super.Depth = 2 then
sub.EmployeeID end),
      coalesce(super.Level4, case when super.Depth = 3 then
sub.EmployeeID end),
      coalesce(super.Level5, case when super.Depth = 4 then
sub.EmployeeID end)
  from AdventureWorks.HumanResources.Employee sub, Flattened super
    where sub.ManagerID = super.EmployeeID
)
select Flattened.ManagerID, Flattened.EmployeeID, Flattened.Depth,
Flattened.HierarchyPath,
    Flattened.Level1, Flattened.Level2, Flattened.Level3,
Flattened.Level4,
    Flattened.Level5,
  case Depth when 2 then Flattened.Level1 when 3 then
Flattened.Level2 when 4 then Flattened.Level3 when 5 then
Flattened.Level4 end Ancestor1,
  case Depth when 3 then Flattened.Level1 when 4 then
Flattened.Level2 when 5 then Flattened.Level3 end Ancestor2,
  case Depth when 4 then Flattened.Level1 when 5 then
Flattened.Level2 end Ancestor3,
  case Depth when 5 then Flattened.Level1 end Ancestor4
into AdventureWorks.HumanResources.EmployeeFlattened
from Flattened
order by Level1, Level2, Level3, Level4, Level5;

In accordance with an embodiment, the closure table 312 stores the transitive closure of the value hierarchy table. The closure table contains one row for every pair of members that have an ancestral relationship of any distance (self, parent, grandparent, great-grandparent, . . . ). The columns in this table include: (1) member key; (2) ancestor key; (3) depth of the member from the root of the hierarchy; (4) distance of the member from the ancestor; (5) key of each ancestor indexed beginning from the current member (ancestor1 key, ancestor2 key, . . . ) ancestor1 key is the same as parent key; and (6) key of each ancestor indexed beginning from the root member (level1 key, level2 key, . . . ). In accordance with an embodiment, once created, the closure table will allow the BI server to easily (via optimal SQL) discover the ancestors and descendants of a particular member. Table 2 below illustrates one non-limiting example of the possible SQL used to create the closure table 312:

TABLE 2 with Closure(ManagerID, EmployeeID, Distance, HierarchyPath,
    Ancestor1, Ancestor2, Ancestor3, Ancestor4)
as
(
  select directs.EmployeeID, directs.EmployeeID, 0,
      cast('/' + cast(directs.EmployeeID as varchar) as
varchar(8000)),
      null, null, null, null
    from AdventureWorks.HumanResources.Employee directs
  union all
    select
      super.ManagerID, sub.EmployeeID, sub.Distance + 1,
      cast('/' + cast(super.ManagerID as varchar) +
sub.HierarchyPath as varchar(8000)),
      coalesce(sub.Ancestor1, case when sub.Distance = 0 then
super.ManagerID end),
      coalesce(sub.Ancestor2, case when sub.Distance = 1 then
super.ManagerID end),
      coalesce(sub.Ancestor3, case when sub.Distance = 2 then TABLE 2-continued

```
super.ManagerID end),
      coalesce(sub.Ancestor4, case when sub.Distance = 3 then
super.ManagerID end)
   from AdventureWorks.HumanResources.Employee super, Closure sub
   where super.EmployeeID = sub.ManagerID
      and super.ManagerID is not null
)
select Closure.ManagerID, Closure.EmployeeID, Closure.Distance,
Closure.HierarchyPath,
      Closure.Ancestor1, Closure.Ancestor2, Closure.Ancestor3,
Closure.Ancestor4,
   case Distance when 0 then Closure.EmployeeID when 1 then
Closure.Ancestor1 when 2 then Closure.Ancestor2 when 3 then
Closure.Ancestor3 when 4 then Closure.Ancestor4 end Level1,
   case Distance when 1 then Closure.EmployeeID when 2 then
Closure.Ancestor1 when 3 then Closure.Ancestor2 when 4 then
Closure.Ancestor3 end Level2,
   case Distance when 2 then Closure.EmployeeID when 3 then
Closure.Ancestor1 when 4 then Closure.Ancestor2 end Level3,
   case Distance when 3 then Closure.EmployeeID when 4 then
Closure.Ancestor1 end Level4,
   case Distance when 4 then Closure.EmployeeID end Level5
into AdventureWorks.HumanResources.EmployeeClosure
from Closure
   inner join AdventureWorks.HumanResources.Employee as emp on
(Closure.EmployeeID = emp.EmployeeID)
   inner join AdventureWorks.HumanResources.Employee as mgr on
(Closure.ManagerID = mgr.EmployeeID)
order by EmployeeID, Distance;
```

Once the BI server 300 receives a query from the user 320, it can rewrite the queries to employ the closure table generated in the BI repository. In accordance with an embodiment, the rewrite can be performed according to the following rules:

1) Replace all IS ANCESTOR/DESCENDANT OF operators with subqueries on closure table. Exclude self relations contained in the closure table (A as an ancestor of A);
2) Replace all IS PARENT OF and IS LEAF operators with subqueries on base table.
3) Replace all IS CHILD OF operators with an IN expression that has the parent key on the LHS.
4) For AncestorValue or ValueAtDepth functions inner join the base table with the flattened table to get the desired ancestor key. Join the base table base on this ancestor key to get the desired column. Optimization: If the referenced column is part of the value hierarchy key, then eliminate the self join with the base table.
5) For AggregateByHierarchy join the fact table with the closure table in a derived table and compute the hierarchical aggregate within that derived table. Join the derived table with the rest of the query on the value hierarchy member key.

One non-limiting example of a possible SQL rewrite for the isAncestorOf hierarchical operator is shown in Table 3 below:

TABLE 3

```
-- IS ANCESTOR OF
--
-- Logical SQL:
-- selection EmpSel   (EmployeeID, LoginID, Title, ParentEmployeeID,
--                    EmpLevel1, EmpLevel2, EmpLevel3, EmpLevel4,
EmpLevel5)
-- (
--      (
--         Employee.EmployeeID, Employee.LoginID, Employee.Title,
AncestorValue(Employee.EmployeeID, 1),
--         ValueAtDepth(Employee.EmployeeID, 1),
ValueAtDepth(Employee.EmployeeID, 2),
--         ValueAtDepth(Employee.EmployeeID, 3),
```

TABLE 3-continued

```
ValueAtDepth(Employee.EmployeeID, 4),
--         ValueAtDepth(Employee.EmployeeID, 5)
--      ) when Employee.EmployeeID IS ANCESTOR OF (12, 13, 14)
-- )
-- select EmpSel.EmployeeID, EmpSel.LoginID, EmpSel.Title,
EmpSel.ParentEmployeeID
-- from Catalog
-- order by EmpSel.EmpLevel1, EmpSel.EmpLevel2, EmpSel.EmpLevel3,
EmpSel.EmpLevel4, EmpSel.EmpLevel5
select a.EmployeeID, a.LoginID, a.Title, b.ancestor1 as
ParentEmployeeID, b.HierarchyPath
from AdventureWorks.HumanResources.Employee a
     inner join AdventureWorks.HumanResources.EmployeeFlattened
b on (a.EmployeeID = b.EmployeeID)
where a.EmployeeID in
     (
        select a1.ManagerID
        from AdventureWorks.HumanResources.EmployeeClosure a1
        where a1.EmployeeID in (12, 13, 14)
           and a1.EmployeeID != a1.ManagerID -- Exclude self
relations
     )
order by b.Level1, b.Level2, b.Level3, b.Level4, b.Level5;
```

In accordance with an embodiment, the BI server enables users to define selections using the hierarchical relationships. As a value hierarchy does not have levels, hierarchical syntax is essentially the only mechanism to define dimensional selections. In accordance with an embodiment, the following operators are provided to allow users to express hierarchical selections:

Is Parent Of—Determine if the current member, for any given row, is a parent of another member (specified as a—(a) literal (b) column reference or (c) a sub-query).

Is Child Of, Is Ancestor of, Is Descendant of, Is Sibling of—Along similar lines as Is Parent of.

Is Leaf—Does the current member have any children?

In accordance with an embodiment, hierarchical Selections will result in a flat list of members, without details on the parentage. For example, Is Descendant of 'Ed', would return all the employees within Ed's organization. In accordance with one embodiment, the reporting lines ('Jim' reports 'Ed', 'Eric' reports to 'Jim') details can be obtained by drill insert or by view parentage type queries. The view parentage type queries provide a navigation link that allows users to click on a member in a value hierarchy and view (as a separate tabular query) all the managers in the employees reporting line. This result can be sorted based on the distance of each ancestor from the current employee.

In accordance with an embodiment, the BI server can provide drill-insert for Value Hierarchies. Users are thus able to explore a value hierarchy via one-click drills. As such, the system can determine that a selected employee has direct reports and hence make these members drill-able when selected by the user.

In accordance with various embodiments, two types of aggregation are provided with Value hierarchies In accordance with an embodiment, tree aggregation aggregates a node's values and all its descendant values. Node aggregation, on the other hand, aggregates all values of a node.

In accordance with an embodiment, the user or administrator can create a value hierarchy by using administration tool. For example, the user can specify: (1) Parent and a Child item. (eg. 'Manager' and 'Employee'); (2) Name for the hierarchy; and (3) Attribute columns that contain the properties of the Value Hierarchy (for example, Title, Salary, Age etc. are all properties of an employee that can be modeled as attributes of the Organization Value Hierarchy).

In accordance with an embodiment, the following properties apply to value hierarchies: (1) a dimension containing a value hierarchy cannot contain any other hierarchy; (2) value hierarchies will not contain named Levels; (3) every hierarchy (dimension) member should have a unique key (the child column should be a primary key for the value hierarchy folder); (4) each child should uniquely identify a Parent; (5) the child and parent items should be of the same data type (typically, they are expected to be ID columns with a label column associated with the child column); and (6) there should be uniqueness and a non-null constraint on the child column.

In various embodiments, the BI Server requires additional metadata and table structures to be able to support value hierarchies. In accordance with an embodiment, the administration tool creates this metadata (and the required underlying tables) as a part of the value hierarchy creation. The required enablement can vary depending on the data source.

In accordance with an embodiment, for relational data sources, the BI Server will need a closure table as previously described. Preferably, this structure should be deployed in the schema that holds the source table for this dimension (and the corresponding facts). The metadata about these tables contains the column bindings for the closure table. The role of the metadata is to identify each of the required.

In accordance with an embodiment, for multi-dimensional sources, the BI server needs the name of the parent-child relation. The value hierarchy (Dimension) will own the enablement structures. Users will be able to either have the Admin tool create the tables directly or obtain a script from the system, create the tables and register these tables with the value hierarchy. These tables may need to be refreshed occasionally (for example, the organization tree will change if there is a re-organization of the company).

In accordance with an embodiment, a set of logical SQL extensions is provided on the BI server. For example, a list of operators below can be used with value hierarchies. These operators can be used within the when clause of a selection, or within where/having clauses of a logical SQL statement.

<Value Hierarchy Key Column> isParentOf (list of values or column reference)—this operator returns true for a row if the value for value hierarchy key column is the parent of the value (returned by expression list or subquery) For example, "show me all the employees whose parent value is 'Larry'".

Is Descendant of, Is Ancestor of, Is Child of—along similar lines as above.

<Column> IsLeaf (hierarchyName)—this operator returns true if the current member does not have any children.

Figure 4A:
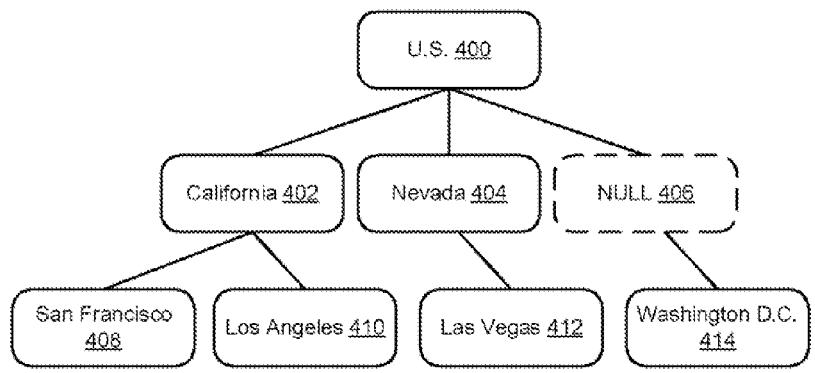
FIG. 4A is an illustration showing an example of a skip level hierarchy that can be used with the BI server, in accordance with various embodiments of the invention.

FIG. 4A is an illustration showing an example of a skip level hierarchy that can be used with the BI server, in accordance with various embodiments of the invention. As illustrated, skip level hierarchies are hierarchies where there are members that don't have a value for a particular ancestor level. For example, as shown in this figure, while most of the cities (408, 410, 412) belong to a particular state (402, 404), 'Washington D.C.' 414 doesn't belong to any state. The expectation is that users can still navigate from the country level (USA) 400 to 'Washington D.C.' 414 and below. In accordance with an embodiment, when a particular ancestor level is not associated with a particular value, the node is represented by a value "NULL".

In accordance with an embodiment, skip level nodes are never displayed and do not affect computations. When sorting hierarchically, members will appear under the nearest ancestors. For example, as illustrated, when the BI server encounters the null value node for the state, the isLeaf( ) function may be used to determine if the NULL in the display is drill-able and contains further nodes below it. All computation can subsequently treat the NULL value as a unique child within its parent. Level-based measures and aggregate-by calculations can group all the skip-level nodes together. For instance, if 'USA' had another city that didn't belong to a state, in addition to Washington D.C., both of these cities can be grouped together under the NULL parent. In accordance with an embodiment, the dimension level object can be extended to contain an additional property called NullsAllowed. Levels that can be NULL, in a ragged or skip-level dimension should contain TRUE for this property. Users/Applications can use this property to determine whether they should use the IsLeaf function call to discover the drill opportunities for the current dimension member.

Figure 4B:
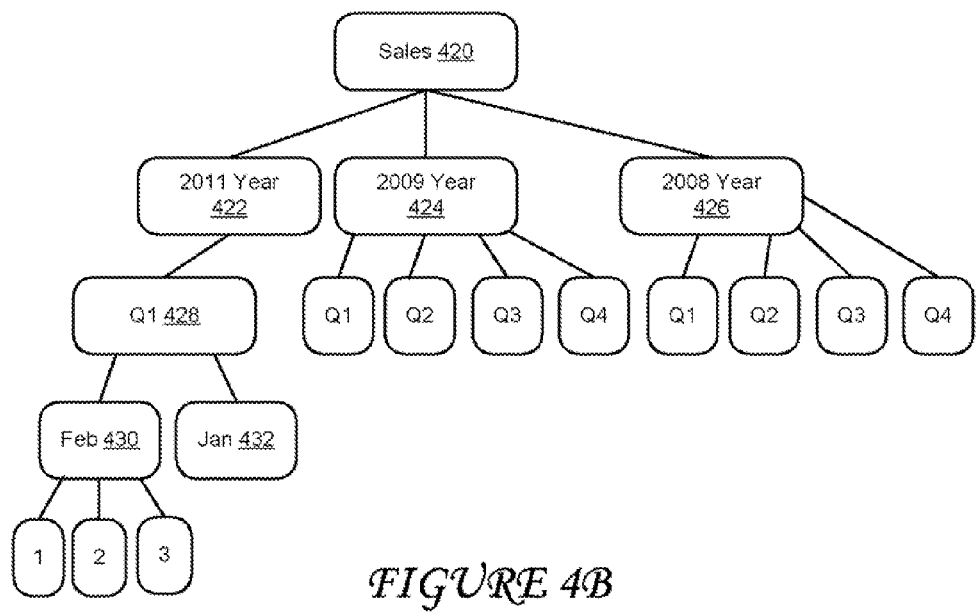
FIG. 4B is an illustration showing an example of a ragged hierarchy that can be supported by the BI server, in accordance with various embodiments of the invention.

FIG. 4B is an illustration showing an example of a ragged hierarchy that can be supported by the BI server, in accordance with various embodiments of the invention. As illustrated, ragged hierarchies are hierarchies where all the leaves do not have the same depth. For example, as shown in this figure, a site may choose to have data for the current month at the day level, previous month's data at the month level, previous 5 years data at the quarter level. As such, the sales for year 2011 (current year) 422 are stored in the hierarchy by quarter 428, by month (430, 432) and by day (1, 2, 3). Sales for the previous years (424, 426), on the other hand, are stored only by quarter. This storage of sales data creates a ragged hierarchy. In accordance with an embodiment, the ragged hierarchy is defined as a star dimension; and each leaf node of the hierarchy is associated with a unique key.

Figure 5:
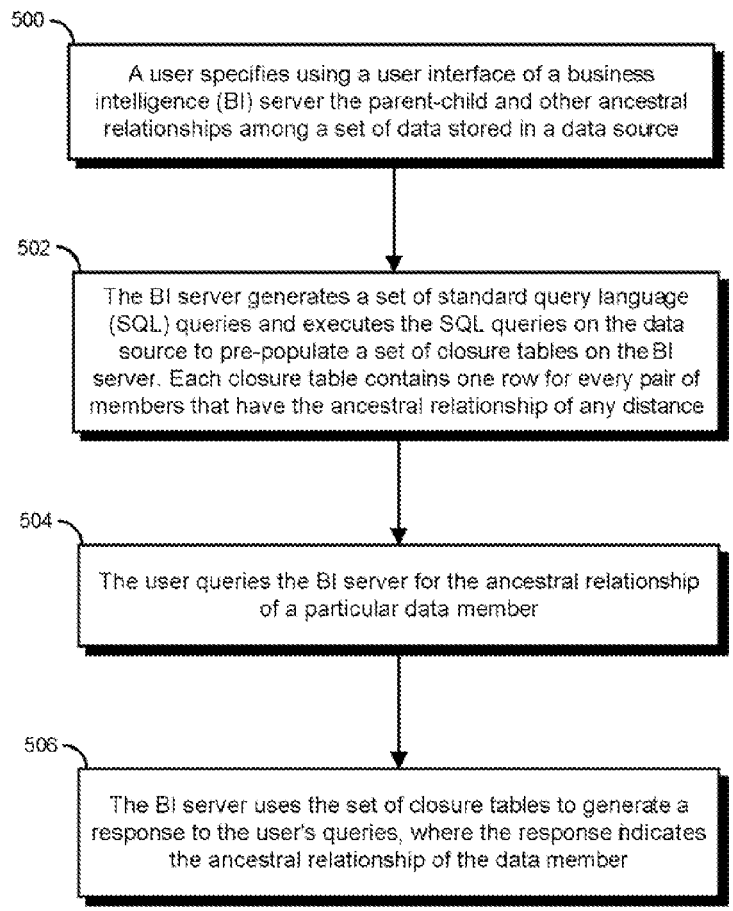
FIG. 5 is a flow chart illustration of the values hierarchy feature for the BI server, in accordance with various embodiments of the invention.

FIG. 5 is a flow chart illustration of the values hierarchy feature for the BI server, in accordance with various embodiments of the invention. As shown in step 500, the administrator defines the parent and child relationships among the structural data by way of a user interface. In step 502, the BI server generates a set of tables and structured query language (SQL) queries to populate the tables. In accordance with an embodiment, the BI server prepopulates a closure table that includes one row for every pair of members that have an ancestral relationship of any distance. Thereafter, users can use hierarchical operators in their queries to specify the ancestral or parent-child relationships (step 504). In accordance with an embodiment, the BI server employs the closure table to determine the ancestral relationship among the structural data (step 506).

Further details regarding value hierarchies, skip level hierarchies and ragged hierarchies can be found in U.S. Provisional Application No. 61/349,754, which is incorporated herein in its entirety, including all of the Appendices filed therewith.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions. In one embodiment, the computer readable storage medium is non-transitory.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention.

What is claimed is:

1. A method for providing value hierarchies in a business intelligence server environment, said method comprising:
   receiving, on a user interface of a business intelligence (BI) server, a specification of ancestral relationships among a set of data stored in a data source;
   generating, by the BI server, a set of structured query language (SQL) queries and executing said SQL queries on the data source to pre-populate a set of closure tables, wherein each closure table contains one row for every pair of members that have said ancestral relationship of any distance; and
   receiving, at the BI server, a request for the ancestral relationship of a particular data member; and employing the set of closure tables by said BI server to generate a response to said request, said response indicating the ancestral relationship of said data member,
   wherein the BI server represents a level hierarchy by implementing a separate column for each level of the hierarchy,
   wherein each level of the hierarchy is represented by a level key;
   wherein the BI server determines that a particular level in the level hierarchy is skipped and contains no value at said particular level and represents the skipped level of the hierarchy with a null key, and
   wherein if the skipped level is discovered by the BI server during retrieval of information while drilling down through the level hierarchy, the BI server determines which next level following the skipped level contains a value and returns said value in the next level.

2. The method of claim 1, wherein each of the set of closure tables further includes a set of columns comprising one or more of the following: a member key, an ancestor key, a depth of the member from the root of the hierarchy, a distance of the member from the ancestor; a key of each ancestor indexed beginning from the current member; and a key of each ancestor indexed beginning from the root member.

3. The method of claim 1, wherein the request is an SQL query and wherein the BI server replaces all operators of the SQL query that request an ancestor or descendant of the member with sub-queries on the closure table.

4. The method of claim 1, wherein the BI server replaces all operators in the SQL query that request a parent or leaf of the member with sub-queries on a base table.

5. The method of claim 1, wherein the BI server replaces all operators in the SQL query that request a child of the data member with an IN expression.

6. The method of claim 1, wherein the BI server rewrites ancestor value functions or value at depth functions by performing an inner join on a base table with a flattened table to get a desired ancestor key.

7. The method of claim 1, wherein for aggregate by hierarchy request, the BI server joins a fact table with the closure table in a derived table and computes a hierarchical aggregate within the derived table.

8. The method of claim 1, further comprising: representing a level hierarchy in said BI server by implementing a separate column for each level of the hierarchy, wherein each level of the hierarchy is represented by a level key; determining that the level hierarchy is ragged and contains an unbalanced structure with levels of varying depth; and designating the columns for levels of varying depth with null values to balance the level hierarchy, wherein if the level hierarchy is navigated, the BI server exposes a function to determine whether the column is a level to determine if the BI server can drill drills on the value specified by the function.

9. The method of claim 1, further comprising: populating, by the BI server, a flattened table that includes a flattened representation of the value hierarchy with a key of each ancestor in a separate column, wherein the flattened table includes one or more of the following: a member key, a parent key, a depth of the member from the root of the hierarchy, a distance of the member from the ancestor; a key of each ancestor indexed beginning from the current member; and a key of each ancestor indexed beginning from the root member.

10. A system for providing value hierarchies, said system comprising:
    a memory; at least one processor coupled to the memory;
    a business intelligence (BI) server including a graphical user interface that is employed to receive a specification of at least one ancestral relationship among a set of data; and
    a data source storing the set of data; wherein the BI server generates a set of structured query language (SQL) queries and executes said SQL queries on the data source to pre-populate a set of closure tables, wherein each closure table contains one row for every pair of members that have said ancestral relationship of any distance; wherein,
    after pre-populating said closure tables, the BI server receives a request for the ancestral relationship of a particular data member; and employs the set of closure tables on said BI server to generate a response to said request, said response indicating the ancestral relationship of said data member, wherein the BI server represents a level hierarchy by implementing a separate column for each level of the hierarchy,
    wherein each level of the hierarchy is represented by a level key;
    wherein the BI server determines that a particular level in the level hierarchy is skipped and contains no value at said particular level and represents the skipped level of the hierarchy with a null key, and wherein if the skipped level is discovered by the BI server during retrieval of information while drilling down through the level hierarchy, the BI server determines which next level following the skipped level contains a value and returns said value in the next level.

11. The system of claim 10, wherein each of said set of closure tables further includes a set of columns comprising one or more of the following: a member key, an ancestor key, a depth of the member from the root of the hierarchy, a distance of the member from the ancestor; a key of each ancestor indexed beginning from the current member; and a key of each ancestor indexed beginning from the root member.

12. The system of claim 10, wherein the request is an SQL query and wherein the BI server replaces all operators of the SQL query that request an ancestor or descendant of the member with sub-queries on the closure table.

13. The system of claim 10, wherein the request is an SQL query and wherein the BI server replaces all operators in the SQL query that request a parent or leaf of the member with sub-queries on a base table.

14. The system of claim 10, wherein the request is an SQL query and wherein the BI server replaces all operators in the SQL query that request a child of the data member with an IN expression.

15. The system of claim 10, wherein the BI server rewrites ancestor value functions or value at depth functions by performing an inner join on a base table with a flattened table to get a desired ancestor key.

16. The system of claim 10, wherein for aggregate by hierarchy request, the BI server joins a fact table with the closure table in a derived table and computes a hierarchical aggregate within the derived table.

17. The system of claim 10, wherein the BI server represents a level hierarchy by implementing a separate column for each level of the hierarchy, wherein each level of the hierarchy is represented by a level key; wherein the BI server determines that the level hierarchy is ragged and contains an unbalanced structure with levels of varying depth; and wherein the BI server designates the columns for levels of varying depth with null values to balance the level hierarchy, wherein if the level hierarchy is navigated, the BI server exposes a function to determine whether the column is a level to determine if the BI server drills on the value specified by the function.

18. A computer readable storage medium storing a set of instructions for providing value hierarchies in a business intelligence server, said instructions, when executed by one or more processors, causing the one or more processors to perform the steps of:

receiving, on a user interface of a business intelligence (BI) server, a specification of ancestral relationships among a set of data stored in a data source;

generating, by the BI server, a set of structured query language (SQL) queries and executing said SQL queries on the data source to pre-populate a set of closure tables, wherein each closure table contains one row for every pair of members that have said ancestral relationship of any distance;

receiving, at the BI server, a request for the ancestral relationship of a particular data member; and employing the set of closure tables by said BI server to generate a response to said request, said response indicating the ancestral relationship of said data member, wherein the BI server represents a level hierarchy by implementing a separate column for each level of the hierarchy, wherein each level of the hierarchy is represented by a level key;

wherein the BI server determines that a particular level in the level hierarchy is skipped and contains no value at said particular level and represents the skipped level of the hierarchy with a null key, and wherein if the skipped level is discovered by the BI server during retrieval of information while drilling down through the level hierarchy, the BI server determines which next level following the skipped level contains a value and returns said value in the next level.

* * * * *

UNITED STATES PATENT AND TRADEMARK OFFICE
CERTIFICATE OF CORRECTION

PATENT NO. : 8,326,857 B2
APPLICATION NO. : 13/038231
DATED : December 4, 2012
INVENTOR(S) : Bolsius et al.

It is certified that error appears in the above-identified patent and that said Letters Patent is hereby corrected as shown below:

In column 4, line 4, delete ")" and insert -- ). --, therefor.

In column 11, line 45, delete "'Larry'"." and insert -- 'Larry'. --, therefor.

In column 14, line 31-32, in Claim 8, delete "can drill drills" and insert -- can drill --, therefor.

Signed and Sealed this
Twelfth Day of March, 2013

Teresa Stanek Rea
*Acting Director of the United States Patent and Trademark Office*